United States Patent
Snelling (10) Patent No.: US 9,953,188 B2
(45) Date of Patent: Apr. 24, 2018

(54) SYSTEM, METHOD, AND PROGRAM FOR STORING AND CONTROLLING ACCESS TO DATA REPRESENTING PERSONAL BEHAVIOR

(71) Applicant: FUJITSU LIMITED, Kawasaki-shi, Kanagawa (JP)

(72) Inventor: David Snelling, Flackwell Heath (GB)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 15/003,056

(22) Filed: Jan. 21, 2016

(65) Prior Publication Data

US 2016/0232377 A1    Aug. 11, 2016

(30) Foreign Application Priority Data

Feb. 5, 2015   (GB) .................................. 1501934.2

(51) Int. Cl.
*G06F 7/04* (2006.01)
*G06F 21/62* (2013.01)

(52) U.S. Cl.
CPC ................. *G06F 21/6254* (2013.01)

(58) Field of Classification Search
CPC .................................................. G06F 21/6254
See application file for complete search history.

(56) References Cited

U.S. PATENT DOCUMENTS

| | | | | |
|---|---|---|---|---|
| 6,148,067 A | * | 11/2000 | Leipow ............. | H04M 3/42008 370/259 |
| 6,938,022 B1 | * | 8/2005 | Singhal .............. | G06F 21/6254 705/74 |
| 7,264,152 B2 | * | 9/2007 | Tsuei .................... | G06Q 10/08 235/380 |
| 7,324,972 B1 | * | 1/2008 | Oliver ................... | G06Q 10/00 705/26.1 |
| 8,225,386 B1 | * | 7/2012 | de Jong ............. | G06Q 20/3552 713/184 |

(Continued)

OTHER PUBLICATIONS

British Search Report dated Jul. 27, 2015, in corresponding British Application No. GB 1501934.2.

(Continued)

*Primary Examiner* — Techane Gergiso
(74) *Attorney, Agent, or Firm* — Staas & Halsey LLP (57) ABSTRACT

A system for storing and controlling access to data representing personal behavior, the system comprising an ID retrieval apparatus to receive identifying information revealing the identity of an individual, to submit a request corresponding to the received identifying information to an ID generation apparatus, to receive an anonymized user ID in return, and to output the user ID to the individual; a data engine comprising a data store and an access controller, the store being inaccessible to the ID retrieval apparatus and configured to receive and store personalized behavioral data, access to the stored behavioral data being controlled by the controller, the behavioral data representing behavior of the individual, which data are anonymously personalized with the user ID; the controller controlling access to the data by requiring that access requests from service providers specify the user ID with which the behavioral data are personalized to access the data.

10 Claims, 4 Drawing Sheets

(56) References Cited

U.S. PATENT DOCUMENTS

| | | | |
|---|---|---|---|
| 2002/0116317 A1* | 8/2002 | May | G06Q 30/08 705/37 |
| 2003/0188171 A1 | 10/2003 | DeCenzo et al. | |
| 2004/0098625 A1* | 5/2004 | Lagadec | G06Q 30/02 726/4 |
| 2005/0283621 A1 | 12/2005 | Sato et al. | |
| 2006/0085454 A1 | 4/2006 | Blegen et al. | |
| 2007/0067297 A1* | 3/2007 | Kublickis | G06Q 30/02 |
| 2008/0022414 A1* | 1/2008 | Cahn | H04L 9/3236 726/28 |
| 2008/0098220 A1 | 4/2008 | Spalink et al. | |
| 2008/0177636 A1* | 7/2008 | Yoshida | G06Q 10/107 705/26.35 |
| 2009/0150238 A1* | 6/2009 | Marsh | G06Q 30/0645 705/307 |
| 2012/0023247 A1* | 1/2012 | Minamizawa | G06F 21/6263 709/229 |
| 2012/0210120 A1* | 8/2012 | Irvine | G06F 21/6218 713/150 |
| 2014/0200910 A1* | 7/2014 | Schoenberg | H04L 65/403 705/2 |

OTHER PUBLICATIONS

Reed et al, *Data to Life*, London: Coelition, 2013, pp. 157-172.
"Home—Coelition", *Coelition*, 2015, https://coelition.org/, accessed Dec. 15, 2015.

* cited by examiner

SYSTEM, METHOD, AND PROGRAM FOR STORING AND CONTROLLING ACCESS TO DATA REPRESENTING PERSONAL BEHAVIOR

CROSS-REFERENCE TO RELATED APPLICATIONS

This application claims the benefit of United Kingdom Application No. 1501934.2, filed Feb. 5, 2015, the disclosure of which is incorporated herein by reference.

BACKGROUND

1. Field

The present invention lies in the field of systems for storing and controlling access to personalized data. In particular, the invention relates to the anonymization of personalized data and the provision of services to an individual as an anonymous entity.

2. Description of the Related Art

Protocols and schemes exist for generating, personalizing, storing, and accessing data which represent actions of an individual in everyday living. A user is able to register for a service with a service provider, which service provider processes data generated by or on behalf of the user as a service. Results may be provided to the user or to a third party.

Such schemes are designed to allow everyone to safely benefit from increased computing capabilities, mobile devices and cloud networks when dealing with behavioral data.

Because storing this kind of very detailed personal information is hugely sensitive, it is desirable to enable the user to remain anonymous.

SUMMARY

Additional aspects and/or advantages will be set forth in part in the description which follows and, in part, will be apparent from the description, or may be learned by practice of the invention.

Embodiments include a system for storing and controlling access to data representing personal behavior, the system comprising: an ID retrieval apparatus configured to receive identifying information revealing the identity of an individual, to submit a request corresponding to the received identifying information to an ID generation apparatus, to receive an anonymized user ID in return, and to output the anonymized user ID to the individual; a data engine comprising a data store and an access controller, the data store being inaccessible to the ID retrieval apparatus and the ID generation apparatus, and being configured to receive personalized behavioral data, and to store said personalized behavioral data in a controlled access environment to which access is controlled by the access controller, the personalized behavioral data being behavioral data representing behavior of the individual, which behavioral data are anonymously personalized with the anonymized user ID; the access controller being configured to control access to the personalized behavioral data by requiring that data access requests from service providers specify the anonymized user ID with which the behavioral data are personalized in order to access the behavioral data.

The system allows an individual to obtain an anonymized identification that can be used by service providers to access data personal to the individual in order to, for example, provide data processing services to the individual. From the individual's perspective, behavioral data representing the individuals' own behavior can be personalized with a non-identifying (i.e. anonymized) user ID that prevents the physical or legal identity that is the individual from being identified. Therefore, the individual can upload those behavioral data to a data engine accessible to multiple service providers without risk of the behavioral data being attributed to the individual (i.e. by naming). Thus, the individual can benefit from the services of one or more service providers which make use of the behavioral data personal to the individual, without the individual being identifiable. The system puts the individual in control of the persona, that is, the anonymized user ID, which can in turn be used to register for services.

The entities possessing the capability to associate the individual with personal identifying information revealing the identity of the individual (wherein the identity of the individual is taken to mean the particular physical being or legal entity that is the individual) are, in principle, the ID retrieval apparatus, possibly the ID generation apparatus, and the individual themselves. The request corresponding to the received identifying information submitted by the ID retrieval apparatus to the ID generation apparatus may include some or all of the received identifying information, possibly in a processed form. Alternatively, the request corresponding to the received identifying information may simply be a non-identifying request that does not include any of the received identifying information but is triggered by receipt of the identifying information. In the latter case, the correspondence between the identifying information and the request is that the request was triggered by receipt of the identifying information. The ID generation apparatus may be realized as a stateless entity and in that case does not retain any received identifying information revealing the identity of an individual, indeed, it may be that no identifying information is received in any case. The ID retrieval apparatus may or may not (depending on the implementation) retain any identifying information revealing the identity of an individual, but in any case, cannot access the data store storing the personalized behavioral data, and thus in practice is not able to associate personalized behavioral data with a particular individual. The individual can associate his/her own personalized behavioral data with his/her own identity.

The ID retrieval apparatus receiving the anonymized user ID in return is the receipt of the anonymized user ID in return for the submitted request. Hence, the response of the ID generation apparatus to receiving the request is to generate an anonymized user ID and to output the generated anonymized user ID to the ID retrieval apparatus. ID is taken to be identity throughout this document.

The anonymized user ID is unique, so that no two individuals are allocated the same anonymized user ID. The ID generation apparatus may be configured to execute an irreversible hash function to map the submitted personal identifying information onto a much larger anonymized user ID space (i.e. no two different versions of personal identifying information lead to the same anonymized user ID). The personal identifying information is information sufficient to identify the system user from among a population of potential system users. A random element may be included in the generation of the user ID from the submitted personal identifying information. In embodiments in which the request from the ID retrieval apparatus to the ID generation apparatus is non-identifying, which may be termed an anonymized request, it may be that the ID generation apparatus extracts time and/or date information from a system clock at the time of generation of the anonymized user ID in response to the received request, and that an irreversible hash function is used which precludes any two different instances of extracted time and/or date information from mapping to the same anonymized user ID.

Behavioral data may represent a measured physical property of the individual, or may represent an interaction of the individual with infrastructure acting as a source of behavioral data. The behavioral data are personalized by being linked or associated with a persona, the persona being represented by the anonymized user ID. Therefore, the behavioral data stored by the data store are personalized insofar as they are linked to or associated with or attributable to a persona, albeit a persona represented only by an anonymized user ID and thus a persona which can only be linked to an individual by an entity knowing the mapping of anonymized user ID to individual.

The separation of the ID retrieval apparatus and ID generation apparatus from the data engine and the service provider means that individuals are able to sign up for services anonymously using only their anonymized user ID, and no personal identifying information is submitted to the service provider. The ID retrieval apparatus is inaccessible to the service provider. The data engine is inaccessible to the ID retrieval apparatus and the ID generation apparatus.

Embodiments provide individuals with an anonymized persona (as opposed to a simple registration count), embodied by an anonymized user ID, which exists persistently and also enables the individual to operate using one of multiple anonymized personae selectable by the user. Embodiments provide this functionality to the user without encroaching on the user's personal information or revealing additional atoms to a non-authorized service provider or to the data engine.

As a particular example of the functionality of the access controller, the access controller is configured to maintain a list of service providers authorized to access the data store, to determine whether or not a received data access request is from one of the list of service providers, and if not, to block the data access request.

Advantageously, the list provides a mechanism to keep track of service providers that are granted access to data stored by the system. An authentication scheme such as a PKS may be used to verify that requests originate from the service providers that they purport to. Service providers can be added to and removed from the list according to agreements with the body responsible for operating the system.

The service providers use the personalized behavioral data to provide services to the individual. Access to the services is controlled in a manner which enables the individual as a service user to remain anonymous, for example: the system may further comprise: a service providing apparatus operable on behalf of one of the service providers authorized to access the data store and being configured to receive an anonymously personalized registration request from the individual, the anonymously personalized registration request being personalized only by the anonymized user ID, to submit a data access request to the data engine specifying the anonymized user ID and a range of the behavioral data personalized with the specified anonymized user ID, to receive behavioral data from within the specified range from the data engine, to execute data processing on the received behavioral data, and to output a data processing result on behalf of the individual.

Thus, the anonymized user ID serves as a representation or embodiment of a persona within the system, but also as a key by which service providers are granted access to the personalized behavioral data stored by the data store. The individual is not required by the service provider to submit any information revealing his/her identity in return for the service. The range of behavioral data requested by the service provider may be defined not only by the anonymized user ID on behalf of whom the service is being provided, but also by characteristics of the behavioral data including date of generation or date of submission to the data store, category of data (in systems in which the behavioral data are categorized), and limitation upon the device or infrastructure (behavioral data source device) at which the data originate.

Behavioral data represent some element of behavior of the individual either by measuring physical properties of the individual or by representing an interaction between the individual and behavioral data generating infrastructure. Such infrastructure may be devices either owned by or accessible to the user. Data generating infrastructure may be referred to as a behavioral data source device, and in particular implementations, the behavioral data are from a behavioral data source device configured to interact with the individual to generate behavioral data representing behavior of the individual.

The behavioral data source device may be connectable to the data engine over a network, such as the internet, or may be connectable to an intermediate device which is itself connectable to the data engine over a network. The behavioral data source device may itself label generated behavioral data with the anonymized user ID of an individual, or behavioral data may be non-personalized until they reach the intermediate device, at which they are personalized by association with the anonymized user ID.

Examples of behavioral data source devices include so-called smart apparatus which are themselves networked and configured to transmit and/or receive data over a network. Behavioral data source devices may record information representing interactions with an individual, which information is associated with a persona via an anonymized user ID (which may be associated with behavioral data upon creation, or added by the individual or by a device on behalf of the individual upon submission to the data engine). Those interactions may be measurement of a physical property of the individual, so that the behavioral data source device is a sensor apparatus. For example, the behavioral data source device may be a sensor apparatus configured to record a series of measurements of a physical property of the individual as behavioral data, and to submit the recorded series of measurements to the data engine as personalized behavioral data, either by anonymously personalizing the behavioral data with the anonymized user ID of the individual at the sensor apparatus, or via an intermediate device at which the behavioral data are received, anonymously personalized with the anonymized user ID of the individual, and transferred to the data engine as personalized behavioral data.

In another example, a single measurement rather than a series of measurements may be recorded and submitted as behavioral data. A physical property of the individual may be, for example, physical location, or may be a movement-based physical property such as number of steps taken. Other examples include heart rate, temperature, and breathing rate. An intermediate device and/or a sensor apparatus may be provided by, or may execute software downloaded from, a service provider.

The data engine may provide an interface by which behavioral data source devices are able to submit personalized behavioral data.

As a further example of behavioral source devices, a behavioral source device may be configured to interact with the individual, to record information representing the interaction with the individual, and to submit the recorded information to the data engine as personalized behavioral data, either by anonymously personalizing the behavioral data with the anonymized user ID of the individual at the sensor apparatus, or via an intermediate device at which the behavioral data are received, anonymously personalized with the anonymized user ID of the individual, and transferred to the data engine as personalized behavioral data.

Optionally, the behavioral data source device is configured to receive and install software which, when executed, causes the data source device to generate personal data and to submit the generated personal data to the data engine.

That is to say the behavioral data source device may be a user device such as a smart phone or tablet computer, which has hardware that can be accessed by application-level software via an operating system, such as GPS, clock, and/or accelerometers, in order to make measurements that can be used as the basis for behavioral data. The software may be application-level software that is configured to utilize the hardware of the user device in order to gather data and perform pre-processing of the data prior to submission to the data engine. For example, information output by the hardware may be subject to processing by the application-level software in order to generate data representing behavior of the system user in a form that is useful to a service provider and hence is submitted to the data engine. The service provider then accesses the behavioral data via the data engine, performs further processing on the data engine or another service, and provides information to the individual as a service, optionally via the user device.

Optionally, the personalized behavioral data can be masked by the access controller, so that particular service providers can only access data attributed to particular data categories. For example, the data categories may represent different aspects of behavior. As an example of how such masking may be implemented: the data store may be configured to store the received personalized behavioral data in association with a categorization of one or more categories from among a predetermined set of categories; and the access controller may be configured to control access to the personalized behavioral data by, upon receipt of a data access requests from a service provider, identifying the service provider, determining which category or categories from among the predetermined set of categories the identified service provider is authorized to access, and precluding the data access request from accessing personalized behavioral data not categorized in the category or one of the categories which the service provider is authorized to access.

Advantageously, the use of categories to label data gives an element of control to the individual and to the body responsible for the access controller, by preventing every service provider from being able to access all data. For example, there may be certain service providers that are authorized to access personalized behavioral data categorized as relating to leisure activities but prevented from accessing personalized behavioral data categorized as relating to health. The control over access to categories can operate in either or both of two ways: particular service providers can be precluded from accessing personalized behavioral data belonging to particular categories, and/or particular service providers can have access restricted to only being able to access personalized behavioral data belonging to particular categories. The access controller may maintain a list or directory of service providers and access permissions in terms of categories to which they are precluded from accessing and/or the only categories which they are permitted to access.

The category to which data belong may be determined by the behavioral data source device and indicated upon personalized behavioral data submission, or may be determined by the data engine upon receipt of the personalized behavioral data based on an identification of the behavioral data source device.

The ID generation apparatus may be a distinct apparatus from the ID retrieval apparatus, and is effectively a method that can be called remotely by the ID retrieval apparatus in order to exchange identifying information revealing the identity of an individual for an anonymized user ID for use by the individual in registering for services from service providers and in personalizing behavioral data.

In a particular example, an embodiment includes the ID generation apparatus, which is configured to create the anonymized user ID by executing an irreversible process as a response to receiving the request, and to output the anonymized user ID to the individual via the ID retrieval apparatus.

The data store is inaccessible to the ID generation apparatus, and hence no association can be made by the ID generation apparatus between the identifying information of an individual and the personalized behavioral data of an individual. Furthermore, the ID generation apparatus may not receive any identifying information, and in embodiments in which identifying information is received at the ID generation apparatus, it does not store any identifying information. Optionally, the ID generation apparatus does not maintain a record of output anonymized user IDs.

Optionally, the ID generation apparatus is configured to perform the steps of creating and outputting the anonymized user ID as a stateless method.

A particular individual may wish to operate using one or more different personas in the context of the system, and to that end may request more than one anonymized user ID. Particular versions of the system may implement such functionality as follows: the ID retrieval apparatus is configured to submit the personal identifying information to the ID generation apparatus in association with a request for one or more further anonymized user IDs in addition to the anonymized user ID, to receive the one or more further anonymized user IDs, and to output the one or more further anonymized user IDs to the individual; and wherein the behavioral data source device, or the intermediate device when utilized, is configured to accept from the individual a selection of one anonymized user ID from among the anonymized user ID and the one or more further anonymized user IDs, and to anonymously personalize behavioral data with the selected anonymized user ID.

In order to protect user data embodiments may utilize encryption and authentication. For example, the ID retrieval apparatus and/or the ID generation apparatus may be certified via a Public Key Infrastructure.

Embodiments address the desire for anonymous and restricted services. To implement this capability the framework of the prior art is changed at a level fundamental to the protocol and assumptions. Embodiments may additionally include the following features:

On the assumption that name and date of birth are not adequate to identify uniquely an individual in a population, some more information will be needed from the personal identifying information provided by the individual to the ID generation apparatus via the ID retrieval apparatus to avoid clashes in the anonymized user IDs. Therefore, additional information (beyond name and date of birth) such as mother's maiden name, date of birth of parent or other relation, may also be required by the ID generation apparatus. Additional information will also reduce the ability of one individual to request an anonymized user ID on behalf of another individual, due to the high level of personalized identifying information required. The personal identifying information is information uniquely identifying the individual among a population and revealing the identity of the individual.

It may be desirable for an individual to re-submit (to the ID generation apparatus via the ID retrieval apparatus) the same personal identifying information as was submitted on a previous occasion in order to receive a new notification of the anonymized user ID that was issued on the previous occasion. To this end it is desirable that inconsistencies between representations of the same personal identifying information, such as changes in date format, certain characters being capitalized or otherwise, do not result in a different anonymized user ID being issued. Therefore, it may be that the ID retrieval apparatus performs format processing such as setting all text to be capitalized, stripping punctuation, and homogenizing date formats.

There may be an option for an individual to re-submit the same personal identifying information as was submitted to the ID retrieval apparatus on a previous occasion along with a request for a new anonymized user ID (i.e. different than the anonymized user ID generated on the previous occasion). This request may be via an interface provided by the ID retrieval apparatus. Due to the ID generation apparatus operating a stateless method, it may be that a numeric indicator is added to all submissions to the ID generation apparatus specifying whether it is the first, second, third, or other new anonymized user ID per set of personal identifying information that is being requested. Thereby, the second set can be made different from the first but either can be re-requested. It is also desirable for the user to have separate personae for different aspects of everyday activity, thus giving the user more control over their personal information.

The individual may have a password-protected user account with the ID retrieval apparatus. For example, such a user account may enable the individual to know how many anonymized user IDs he/she has requested in the past, and possibly also the dates/times of the requests.

A PKI certificate for the service/function provided by the ID generation apparatus may be implemented.

Embodiments of another aspect include a method for storing and controlling access to data representing personal behavior, the method comprising: at an ID retrieval apparatus, receiving identifying information revealing the identity of an individual, submitting the personal identifying information to an ID generation apparatus, receiving an anonymized user ID from the ID generation apparatus in return, and outputting the anonymized user ID to the individual; at a data engine comprising a data store and an access controller, the data store being inaccessible to the ID retrieval apparatus, receiving and storing personalized behavioral data, access to the stored personalized behavioral data being controlled by the access controller, the personalized behavioral data being behavioral data representing behavior of the individual, which behavioral data are anonymously personalized with the anonymized user ID; at the access controller, controlling access to the stored personalized behavioral data by requiring that data access requests from service providers specify the anonymized user ID with which the personalized behavioral data are personalized in order to access the personalized behavioral data.

Embodiments of another aspect include a suite of computer programs which, when executed by a plurality of separate computing apparatuses, cause the plurality of separate computing apparatuses to perform a method embodying the present invention.

Embodiments of another aspect include: a suite of computer programs comprising: a computer program which when executed by a server, causes the server to function as an ID retrieval apparatus of an embodiment; and a computer program which when executed by a server, causes the server to function as a data engine of an embodiment.

The suite of computer programs may further comprise a computer program which when executed by a server, causes the server to function as the ID generation apparatus of an embodiment. Optionally, the suite of computer programs may include a computer program which when executed by a user device, causes the user device to function as the behavioral data source device and/or intermediate device of an embodiment. Furthermore, embodiments of the present invention include a computer program or suite of computer programs, which, when executed by a plurality of interconnected computing devices, cause the plurality of interconnected computing devices to perform a method embodying the present invention.

Embodiments of the present invention also include a computer program or suite of computer programs, which, when executed by a plurality of interconnected computing devices, cause the plurality of interconnected computing devices to function as a computing apparatus defined above or elsewhere in this document as an invention embodiment.

The computing apparatuses mentioned above and elsewhere in this document may be a server or storage unit or other computer, and the described functions may be performed by loading a set of instructions, stored as a computer program, into memory and executing them with a processor. The computing apparatuses may include one or more of memory, storage, processor, network interfaces, and I/O devices.

Although the aspects (software/methods/apparatuses/systems) are discussed separately, it should be understood that features and consequences thereof discussed in relation to one aspect are equally applicable to the other aspects. Therefore, where a method feature is discussed, it is taken for granted that the apparatus embodiments include a unit or apparatus configured to perform that feature or provide appropriate functionality, and that programs are configured to cause a computing apparatus on which they are being executed to perform said method feature.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

BRIEF DESCRIPTION OF THE DRAWINGS

A detailed description of specific examples of embodiments will be set out below, with reference to the accompanying drawings, in which.

Although a few embodiments have been shown and described, it would be appreciated by those skilled in the art that changes may be made in these embodiments without departing from the principles and spirit of the invention, the scope of which is defined in the claims and their equivalents.

DETAILED DESCRIPTION

Figure 1:
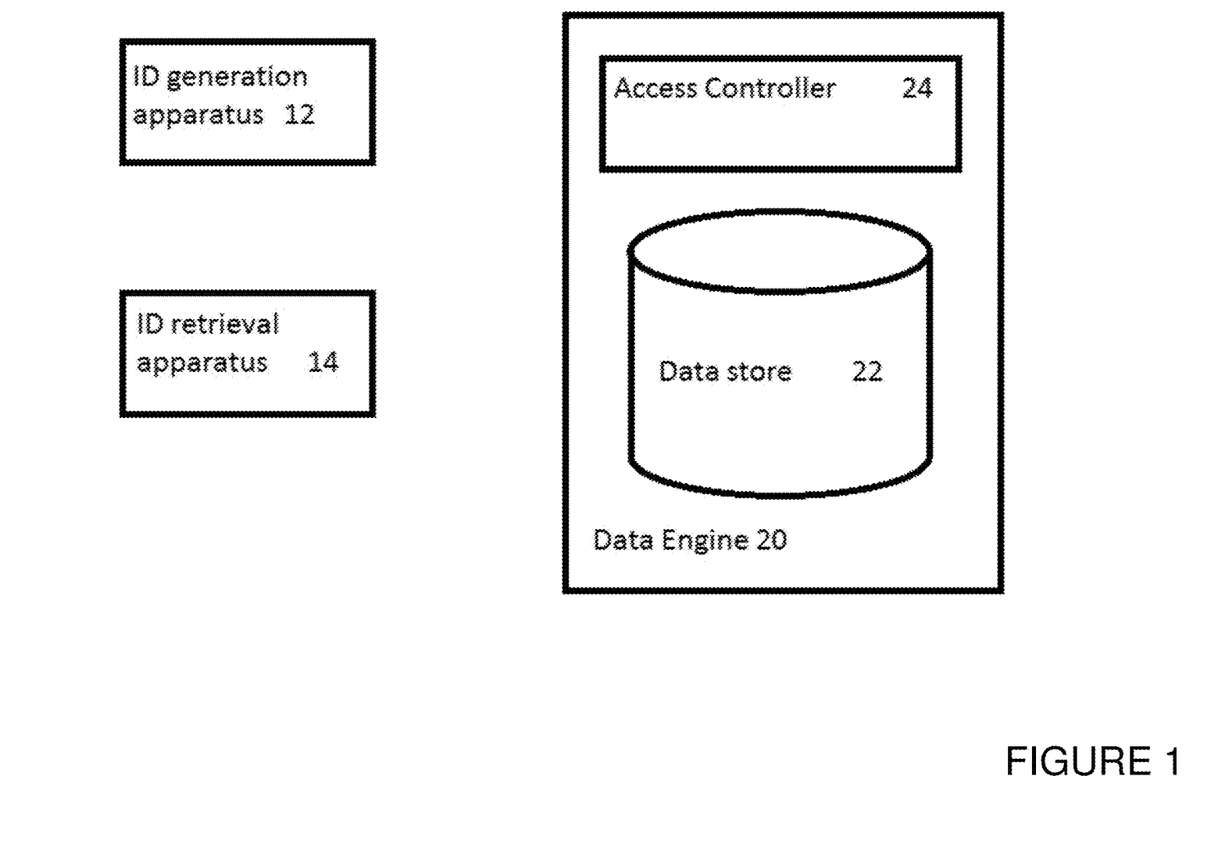
FIG. 1 illustrates a system of an embodiment.

FIG. 1 illustrates a system of an embodiment. The system comprises an ID (ID is used as shorthand for identity throughout this document) generation apparatus 12, an ID retrieval apparatus 14, and a data engine 20 comprising an access controller 24 and a data store 20.

The ID retrieval apparatus 14 is configured to receive identifying information revealing the identity of an individual, to submit a request corresponding to the received identifying information to the ID generation apparatus 12, to receive an anonymized user ID in return, and to output the anonymized user ID to the individual. The submitted request may be anonymized. That is to say, the submitted request may not contain any of the received identifying information, so that one request is not distinguishable from another other than insofar is they are sent at different times. As an alternative, a unique serial number may be attributed to the request.

The ID retrieval apparatus 14 is a server or other networked computing device that is accessible to individuals at disparate geographical locations, for example, over the internet. The server has network I/O functionality, a memory, a processor configured to execute a program to realize the ID retrieval apparatus functionality, and a storage unit configured at least to store the program (in encoded form). The ID retrieval apparatus may be configured to store certain identifying information and optionally corresponding anonymized user ID. If those data are stored by the ID retrieval apparatus 14 then they are stored in a secure fashion, for example, password protected, so that an individual provides a password upon submission of personal identifying information, then that password must be submitted in order to access stored personal identifying information or corresponding anonymized user ID.

The ID generation apparatus 12 is configured to receive personal identifying information from the ID retrieval apparatus 14, to create an anonymized user ID corresponding to the received personal identifying information by executing an irreversible process on the received identifying information, and to output the anonymized user ID to the individual via the ID retrieval apparatus 14.

The ID generation apparatus 12 is a server or other networked computing device that is accessible only to the ID retrieval apparatus 14, for example, over the internet or over a secure network. The ID generation apparatus 12 may be accessible to more than one ID retrieval apparatus 14, so that more than one different entity can fulfill the role of ID retrieval apparatus. The server performing the role of ID generation apparatus 12 has network I/O functionality, a memory, a processor configured to execute a program to realize the ID generation apparatus functionality, and a storage unit configured at least to store the program (in encoded form). The program may be an algorithm that maps a short message (the received personal identifying information) onto a much larger message space (representing the anonymized user IDs) using a cryptographic hash function. Alternatively, the request from the ID retrieval apparatus 14 may contain no identifying information, but the short message may be composed of information such as time/date information read from a system clock or external timing apparatus. Thus, no two different sets of personal identifying information will result in the same anonymized user ID, so clashes are avoided. In some embodiments a randomized element may be incorporated so that the mapping of request to a particular anonymized user ID is at least partially randomized and hence not reliably reproducible. The ID generation apparatus 12 does not store any personal identifying information (indeed in some embodiments it will not receive any) or any record of output anonymized user IDs. The ID generation apparatus is configured to perform its functionality as a stateless method.

The data engine 20 comprises a data store and an access controller, the data store 22 being inaccessible to the ID retrieval apparatus 14 and being configured to receive personalized behavioral data, and to store said personalized behavioral data in a controlled access environment to which access is controlled by the access controller 24, the personalized behavioral data being behavioral data representing behavior of the individual, which behavioral data are anonymously personalized with the anonymized user ID.

The data engine 20 may be realized by a single server or by a network of servers. In particular, the access controller 24 may be a single server, with the data store 22 being a plurality of interconnected storage units. Alternatively, the access controller 24 may be a service performed by a plurality of data storage servers operating in cooperation with one another, and thus the plurality of data storage servers are the date engine 20, performing the function of both the data store 22 and the access controller 24. The one or more storage units forming the data store 22 are a controlled access environment, meaning that parties wishing to access the data stored therein must authenticate themselves, for example, using passwords, authentication codes, or other techniques. In that way, the data engine 20 is able to control which parties can access the personalized behavioral data stored in the data store 22, and in particular can restrict access only to authorized service providers. Furthermore, the access controller 24 is configured to restrict access so that even authorized service providers that have passed authentication can only access particular personalized behavioral data if the anonymized user ID with which those particular personalized behavioral data are personalized is known by the service provider and submitted in a data access request. Therefore each service providers can only access the personalized behavioral data of individuals that have registered with the service provider. Furthermore, the access controller may be configured to further restrict access to personalized behavioral data by storing said data as belonging to one or more categories from a predetermined set of behavioral data categories, and using either a positive (i.e. service providers can only access behavioral data belonging to categories which they have been positively authorized to access) and/or a negative (i.e. service providers can be precluded from accessing behavioral data belonging to specific categories) access policy to restrict access.

Data exchange over the internet or other network between entities of the system and/or entities external to the system may be encrypted.

The data stored by the data store are inaccessible to the ID retrieval apparatus 14 and to the ID generation apparatus 12. Access to the data stored by the data store 22 is limited to identifiable service providers, and an authentication scheme may be implemented in order to verify the provenance of access requests.

Personalized behavioral data may be written to the data store 22, either via the access controller 24 or via some other interface, at the request of an individual and possibly via a behavioral data source device and/or an intermediate device connectable to the data engine 20, for example, via the internet.

The access controller 24 is configured to control access to the personalized behavioral data by requiring that data access requests from service providers specify the anonymized user ID with which the behavioral data are personalized in order to access the behavioral data.

Figure 2:
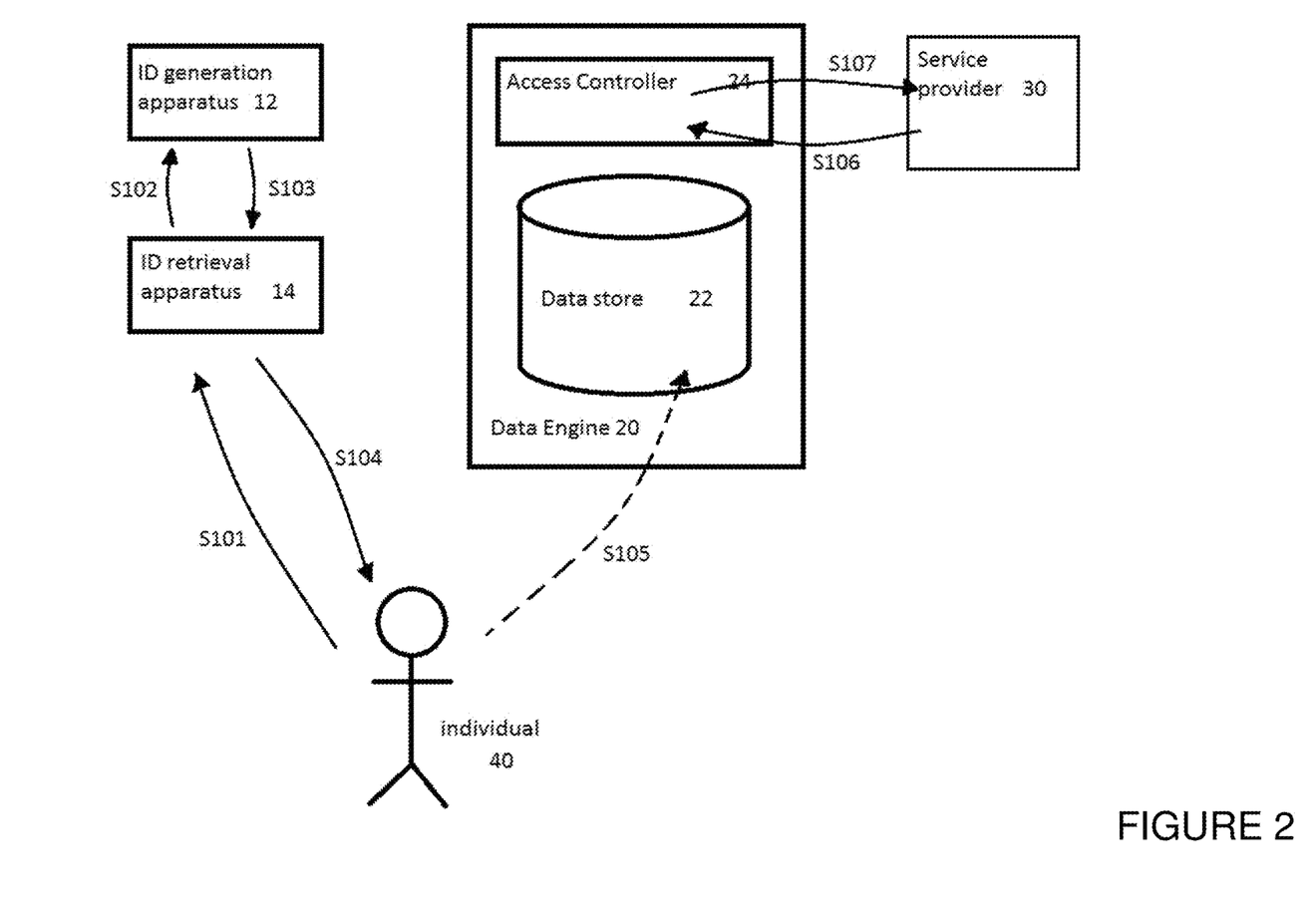
FIG. 2 illustrates how an exemplary method or protocol for storing and controlling access to data representing personal behavior is performed using the system of FIG. 1.

FIG. 2 illustrates how an exemplary method or protocol for storing and controlling access to data representing personal behavior is performed using the system of FIG. 1. Additional entities including an individual 40 and a service provider 30 are included in the particular example of FIG. 2. The service provider may be considered to be internal or external to the system, depending on the implementation.

The individual 40 is a person being identifiable as a particular human or legal entity by personal identifying information. The individual 40 is a system user, and in the context of this document the term individual is interchangeable with the term system user.

The service provider 30 is a party having service providing apparatus such as a server, with which to process personalized behavioral data of a particular persona and use the results of that processing to provide a service to the individual to which the persona (the persona being represented by an anonymized user ID) belongs. Therefore, the service provider 30 in FIG. 2 is represented by a server connectable to the data engine 20 via a network, for example the internet, over a connection that may be encrypted. A PKS system or alternative may be operated on behalf of the data engine 20 to authenticate the identity of the service provider 30.

At step S101, the individual 40 submits personal identifying information to the ID retrieval apparatus 14. The personal identifying information is information revealing the identity of the individual 40. The ID retrieval apparatus receives the submitted personal identifying information and at step S102 submits a request being either the identifying information (possibly after some processing such as capitalization of text, normalizations of date formats), or an anonymized request triggered by the receipt of the identifying information but not containing any identifying information, to the ID generation apparatus 12. The ID generation apparatus 12 receives the request corresponding to the personal identifying information from the ID retrieval apparatus 14 and executes an algorithm to generate an anonymized user identity which is unique and which cannot be reversibly processed to discern personal identifying information. At step S013 the ID generation apparatus 12 outputs the generated user ID to the individual 40 via the ID retrieval apparatus 14 without storing any record of the received personal identifying information. At step S104 the ID retrieval apparatus 14 receives the anonymized user ID from the ID generation apparatus 12 and forwards it to the individual 40.

In participating in steps S101 and S104 the individual 40 may use one or more user devices that are connectable to the ID retrieval apparatus over a secure connection, for example, an encrypted internet connection.

Step S105 represents the receipt of personalized behavioral data relating to the behavior of the individual 40 by the data engine 20 and specifically the storage of those data in the data store 22. The line is dashed in step S105 because in reality the individual 40 does not directly communicate with the data store 40 but actually utilizes behavioral data source infrastructure to generate behavioral data, anonymously personalize the generated data (possibly using an intermediate device), and submit them to the data engine 20 for storage in the data store 22.

The behavioral data relate to measurements of one or more physical properties of the individual 40 and/or interactions of the individual 40 with behavioral data source infrastructure. The behavioral data are anonymously personalized by linking, labeling, or some other form of association with the anonymized user ID generated for the individual 40.

The access controller 24 controls access to the personalized behavioral data stored in the data store 22. At step S106, a data access request from a service provider 30 is received at the access controller 24 (the data store is not directly accessible for read access other than via the access controller 24). The access controller 24 is configured to control access to the stored personalized behavioral data by requiring that the received data access request from the service provider 30 specifies the anonymized user ID with which the personalized behavioral data are personalized in order to access the personalized behavioral data. That is to say, should the service provider wish to access the behavioral data personalized with the anonymized user ID generated for the individual 40, the service provider must specify the anonymized user ID in the access request at step S106. At step S107 the access controller 24 can then respond with the data requested by the service provider 30. The access controller 24 can assume that the individual 40 has registered with the service provider 30 by virtue of the service provider having knowledge of the anonymized user ID.

Figure 3:
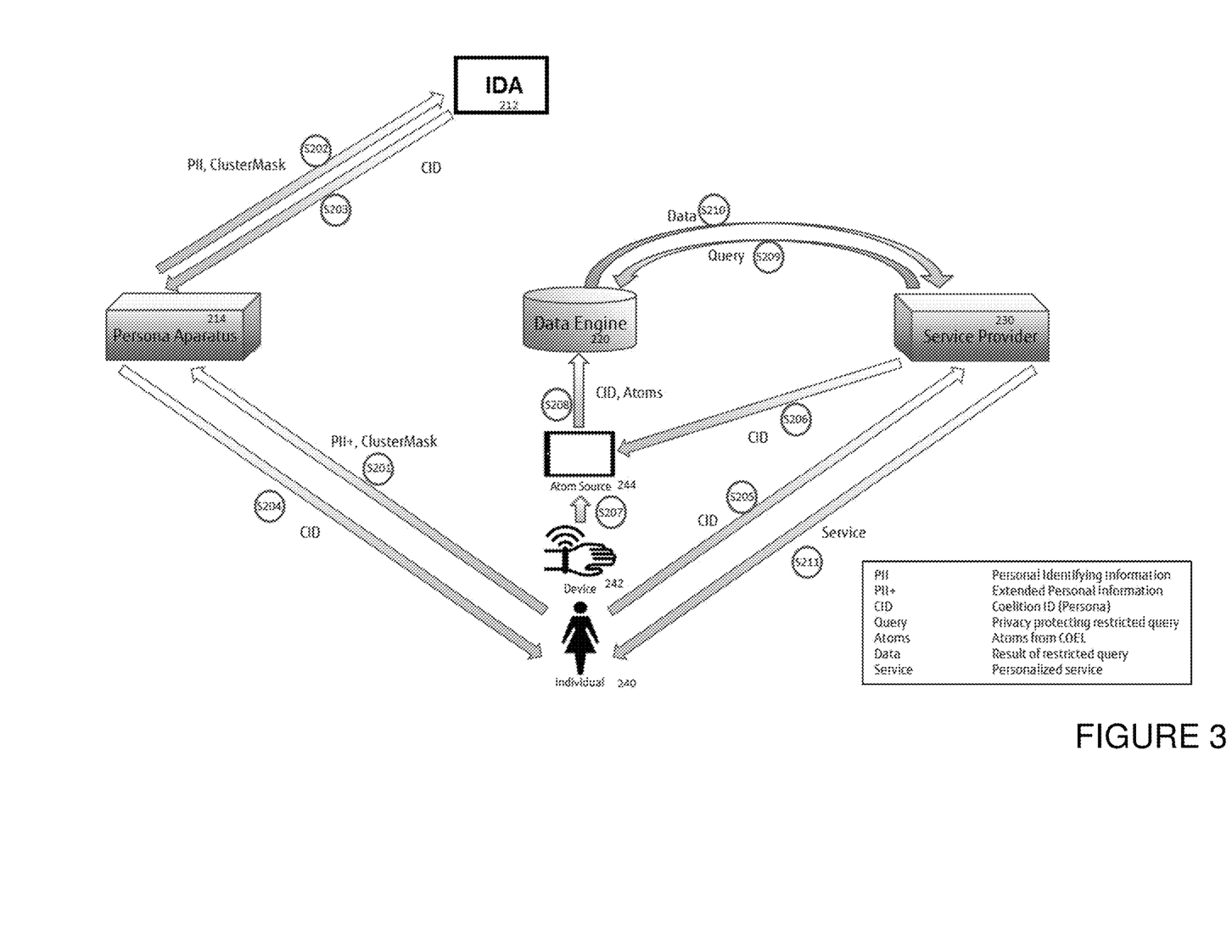
FIG. 3 illustrates a system and protocol/method of an embodiment.

FIG. 3 is a further example of a system and method/protocol of an embodiment. The example of FIG. 3 is presented in the context of the open "Coelition" standard (see http://coelition.org/) but is distinct from the existing Coelition standardized protocol(s) and architecture(s).

The IDA 212 is an identity issuing authority, for example, a Coelition-compliant IDA. The IDA 212 is exemplary of the ID generation apparatus mentioned elsewhere in this document.

The persona apparatus 214 is exemplary of the ID retrieval apparatus mentioned elsewhere in this document.

The data engine 20 is a further example of the data engine 20 of other embodiments. Similarly, the service provider 230 is a further example of a service provider or service providing apparatus of other embodiments.

The device 242 is exemplary of the sensor apparatus mentioned elsewhere in this document and is also exemplary of a behavioral data source device. The atom source 244 is exemplary of a behavioral data source device and may also, as required, function as an intermediate device between the device 242 and the data engine 220.

The Coelition ID (CID) is exemplary of the anonymized user ID mentioned elsewhere in this document. The query is exemplary of the data access request mentioned elsewhere in this document. The atoms are exemplary of the behavioral data mentioned elsewhere in this document, and the combination of CID and atoms, such as at step S208, is exemplary of personalized behavioral data.

Coelition operational requirements prohibit the user from forming an association with the Coelition IDA, and therefore a third party is needed. This persona apparatus 214 fulfils the role of the third party.

An exemplary sequence of operations performed by the apparatus of FIG. 3 is as follows:

At step S202 personalized identifying information, optionally enhanced with some additional information, and optionally masked by a clustermask, is submitted to the persona apparatus by the individual, or system user, 240. At S202, an anonymized request triggered by the receipt of the personal identifying information, or a request containing some or all of the personal identifying information, is submitted by the persona apparatus 214 to the IDA 212. The persona apparatus 214 may perform some processing on the received personal identifying information, such as capitalization, punctuation stripping, and date format normalization. The personalized identifying information should be sufficient to uniquely identify the individual from among a population of potential users. The basic personal identifying information such as name and date of birth may be enhanced with additional personal identifying information such as mother's date of birth to reduce the probability of two sets of submitted personal identifying information being identical. The cryptographic hash function employed by the IDA 212 is such that no two different sets of input personal identifying information map to the same output anonymized user ID. At step S203, the IDA performs a stateless method to exchange the received request, be it anonymized or including some personal identifying information, for a Coelition ID corresponding to the received personalized identifying information, and outputs the Coelition ID to the persona apparatus 214. As an alternative to the ID generation apparatus being stateless (or performing a stateless method), the ID generation apparatus may be made stateful and hence be configured to record a list of output anonymized user IDs in order not to issue the same anonymized user ID twice. A clustermask is optionally employed in step S202.

At S204, the persona apparatus 214 returns the generated CID to the user 240. This CID represents the anonymous persona that the user will use for storing atoms, such as exercise atoms, in the data engine 220.

At step S205 the Service Provider 230, wishing to offer anonymous services to the individual 240, provides a mechanism for registering the individual 240 as an anonymous user. An interface is provided by the service provider 230 whereby registration only requires providing the CID as information identifying the user, that is to say, the user can be identified as a user of the service because the anonymized user ID is personalized to the user, but the identity of the user is not revealed by the registration. Thus, the service provider 230 knows that a user has registered for the service and that the user has utilized the persona apparatus 214 to receive an anonymized user ID, but is not able to identify the user as a physical person or legal entity.

At step S206, software is downloaded to an atom source device 244 by the user. The software is personalized with the CID so that when the software is executed by the atom source device 244, any received or generated behavioral data at step S207 can be personalized with the CID and submitted to the data engine 220. The personalized behavioral data submitted to the data engine 220 by an atom source device 244 running software from a particular service provider 230 may be stored by the data engine 220 as accessible only to that particular service provider 220.

At step S209, the service provider makes a privacy protecting restricted query for behavioral data relating to the user 240 generated by the atom source 244 when running the software of the service provider 230. The CID is included in the query and used as a key by the data engine 220 both to identify the requested data and to authorize access by the service provider 230. Some authentication of the service provider 230 may be carried out by the data engine 220.

At step S211, the service (e.g. a calorie count) is provided anonymously to the user based only on the opaque CID.

Any individual step or combination of steps from among S202, S203, S201, S209, S207, and S208 may be secured via a PKI. Alternatively or additionally, any individual step or combination of steps from among S201, S209, S207, and S208 may be secured via a password.

An example use case of the apparatus and method/protocol of FIG. 3 will now be presented. This is a medical use case in which a step counting service is provided by a service provider for a doctor as a representative of a health service such as the NHS to monitor an individual patient's level of physical activity and report this without the service provider knowing who the patient is (only the health service holds personal identifying information). In this example, the health service is authorized to operate a persona apparatus 214.

Steps S201-S203: the patient (individual) registers for a Coelition ID through their doctor (as a representative of the health service, authorized to operate a persona apparatus 214).

Step S204: the doctor provides the patient with the CID so obtained.

Step S205: the patient uses this CID to register anonymously with the step counting service provider 230.

Steps S206-S210: the service provider 230 the patient with a wrist worn device 242 that, via a mobile phone 244, application reports on the patient's every day human activity (mostly step counting in this case) and stores these atoms in the data engine 220. The step counting service 230 then makes queries against the data gathered by the data engine 220 and generates report on the activity level of the patient (anonymously, as all the foot step service has is the CID).

Step S211: the report can be retrieved by either the doctor or the patient themselves using the CID of the patient.

Figure 4:
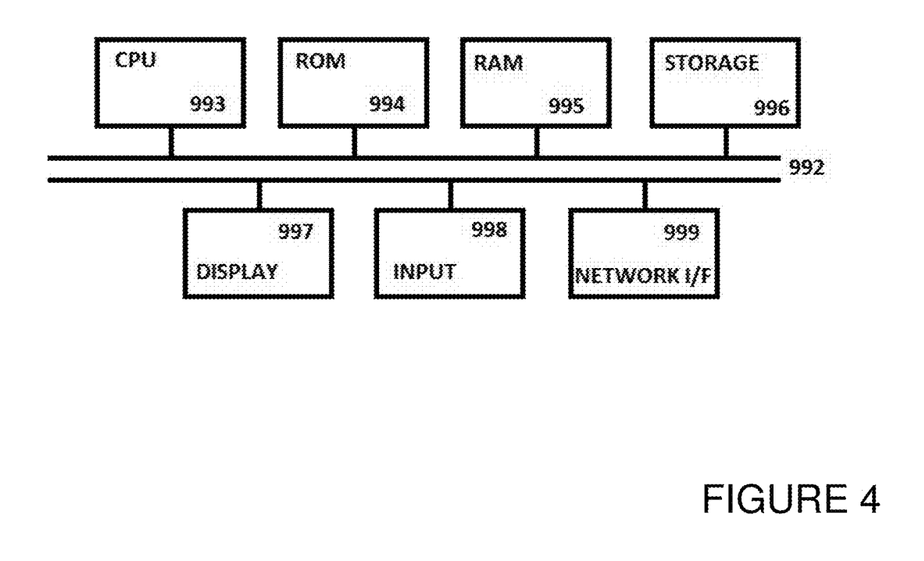
FIG. 4 illustrates a hardware configuration of part of a system of an embodiment.

FIG. 4 is a block diagram of a computing device, such as a data storage server, which may be used to implement one or more elements of a system of an embodiment. For example, the ID generation apparatus, the ID retrieval apparatus, or the data engine may each be implemented by one or more computing devices such as that illustrated in FIG. 4. The data engine may be realized by a plurality of such computing devices cooperating via network interconnections. The computing device comprises a computer processing unit (CPU) 993, memory, such as Random Access Memory (RAM) 995, and storage, such as a hard disk, 996. Optionally, the computing device also includes a network interface 999 for communication with other such computing devices of embodiments. For example, an embodiment may be composed of a network of such computing devices. Optionally, the computing device also includes Read Only Memory 994, one or more input mechanisms such as keyboard and mouse 998, and a display unit such as one or more monitors 997. The components are connectable to one another via a bus 992.

The ID retrieval apparatus and the ID generation apparatus are not able to access the data engine, and therefore the data engine is not provided as part of the same computing device as either the ID retrieval apparatus or the ID generation apparatus.

The CPU 993 is configured to control the computing device and execute processing operations. The RAM 995 stores data being read and written by the CPU 993. The storage unit 996 may be, for example, a non-volatile storage unit, and is configured to store data.

The display unit 997 displays a representation of data stored by the computing device and displays a cursor and dialog boxes and screens enabling interaction between a user and the programs and data stored on the computing device. The input mechanisms 998 enable a user to input data and instructions to the computing device.

The network interface (network I/F) 999 is connected to a network, such as the Internet, and is connectable to other such computing devices via the network. The network I/F 999 controls data input/output from/to other apparatus via the network.

Other peripheral devices such as microphone, speakers, printer, power supply unit, fan, case, scanner, trackerball etc may be included in the computing device.

One or more of the ID generation apparatus, the ID retrieval apparatus, and the data engine, may be embodied as functionality realized by a computing device such as that illustrated in FIG. 4. Methods embodying the present invention may be carried out on, or implemented by, a computing device such as that illustrated in FIG. 4. A plurality of such computing devices may be used to execute software of an embodiment. Computing devices embodying or used for implementing embodiments need not have every component illustrated in FIG. 4, and may be composed of a subset of those components. A method embodying the present invention may be carried out by a single computing device in communication with one or more data storage servers via a network.

The ID generation apparatus may comprise processing instructions stored on a storage unit 996, a processor 993 to execute the processing instructions, and a RAM 995 to store information objects during the execution of the processing instructions.

The ID retrieval apparatus may comprise processing instructions stored on a storage unit 996, a processor 993 to execute the processing instructions, and a RAM 995 to store information objects during the execution of the processing instructions.

The data engine may comprise processing instructions stored on a storage unit 996, a processor 993 to execute the processing instructions, and a RAM 995 to store information objects during the execution of the processing instructions.

What is claimed is:

1. A system for storing and controlling access to data representing personal behavior, the system comprising:
    an ID retrieval apparatus configured to receive identifying information revealing an identity of an individual, to submit a request corresponding to received identifying information to an ID generation apparatus, to receive an anonymized user ID in return, and to output the anonymized user ID to the individual;
    a data engine comprising a data store and an access controller, the data store being inaccessible to the ID retrieval apparatus and being configured to receive and store personalized behavioral data, access to stored personalized behavioral data being controlled by the access controller, wherein the personalized behavioral data are from a behavioral data source device;
    the behavioral data source device being either one of a device configured to interact with the individual and to record information representing an interaction with the individual as behavioral data, and a sensor apparatus configured to record a series of measurements of a physical property of the individual as behavioral data; and
    the behavioral data source device being configured to submit the behavioral data to the data engine as personalized behavioral data, either by one of anonymously personalizing the behavioral data with the anonymized user ID of the individual at the behavioral data source device, and via an intermediate device at which the behavioral data are received, anonymously personalized with the anonymized user ID of the individual, and transferred to the data engine as personalized behavioral data;
    the access controller being configured to control access to the personalized behavioral data by requiring that data access requests from service providers specify the anonymized user ID with which the personalized behavioral data are personalized to access the personalized behavioral data, wherein the access controller is configured to maintain a list of service providers authorized to access the data store, to determine whether a received data access request is from one of the service providers of the list, and when not, to block the data access request;
    the system further comprising:
    a service providing apparatus operable on behalf of the one of the service providers authorized to access the data store and being configured to receive an anonymously personalized registration request from the individual, the anonymously personalized registration request being personalized only by the anonymized user ID, to submit a data access request to the data engine specifying the anonymized user ID and a range of the behavioral data personalized with the specified anonymized user ID, to receive behavioral data from within the range from the data engine, to execute data processing on received behavioral data, and to output a data processing result on behalf of the individual.

2. A system according to claim 1, wherein the behavioral data source device is configured to receive and install software which, when executed, causes the data source device to generate personal data and to submit the generated personal data to the data engine.

3. A system according to claim 1, wherein
    the data store is configured to store received personalized behavioral data in association with a category from among a predetermined set of categories; and
    the access controller is configured to control access to the personalized behavioral data by, upon receipt of a data access requests from a service provider, identifying the service provider, determining which category from among the predetermined set of categories the identified service provider is authorized to access, and precluding the data access request from accessing personalized behavioral data not categorized in the category which the service provider is authorized to access.

4. A system according to claim 1, the system further comprising:
    the ID generation apparatus, which is configured to create the anonymized user ID by executing an irreversible process in response to receiving the request, and to output the anonymized user ID to the individual via the ID retrieval apparatus.

5. A system according to claim 4, wherein the ID generation apparatus is configured to perform creating and outputting the anonymized user ID as a stateless method.

6. A system according to claim 1, wherein the ID retrieval apparatus is configured to submit the request to the ID generation apparatus in association with a request for another anonymized user IDs in addition to the anonymized user ID, to receive the another anonymized user ID, and to output the another anonymized user ID to the individual; and wherein one of the behavioral data source device, and the intermediate device when utilized, is configured to accept from the individual a selection of one anonymized user ID from among the anonymized user ID and the another anonymized user ID, and to anonymously personalize behavioral data with the selected anonymized user ID.

7. A system according to claim 1, wherein one of the ID retrieval apparatus and the ID generation apparatus are certified via a Public Key Infrastructure.

8. A method for storing and controlling access to data representing personal behavior, the method comprising:

receiving, at an ID retrieval apparatus, identifying information revealing an identity of an individual, submitting a request corresponding to received identifying information to an ID generation apparatus, receiving an anonymized user ID from the ID generation apparatus in return, and outputting the anonymized user ID to the individual;

receiving and storing, at a data engine comprising a data store and an access controller with the data store being inaccessible to the ID retrieval apparatus, personalized behavioral data, access to the stored personalized behavioral data being controlled by the access controller, wherein the personalized behavioral data are from a behavioral data source device, the behavioral data source device being either one of a device configured to interact with the individual and to record information representing an interaction with the individual as behavioral data, and a sensor apparatus configured to record a series of measurements of a physical property of the individual as behavioral data; and the method further comprising:

submitting, by the behavioral data source device, the behavioral data to the data engine as personalized behavioral data, either by one of anonymously personalizing the behavioral data with the anonymized user ID of the individual at the behavioral data source device, and via an intermediate device at which the behavioral data are received, anonymously personalized with the anonymized user ID of the individual, and transferred to the data engine as personalized behavioral data;

controlling, at the access controller, access to the stored personalized behavioral data by requiring that data access requests from service providers specify the anonymized user ID with which the personalized behavioral data are personalized to access the personalized behavioral data, including maintaining a list of service providers authorized to access the data store, determining whether a received data access request is from one of the service providers of the list, and when not, blocking the data access request; and at a service providing apparatus operable on behalf of the one of the service providers authorized to access the data store, receiving an anonymously personalized registration request from the individual, the anonymously personalized registration request being personalized only by the anonymized user ID, submitting a data access request to the data engine specifying the anonymized user ID and a range of the behavioral data personalized with the specified anonymized user ID, receiving behavioral data from within the range from the data engine, executing data processing on the received behavioral data, and outputting a data processing result on behalf of the individual.

9. A computer readable non-transitory storage media, comprising:

a first non-transitory storage medium area storing a computer program which when executed by a first server, causes the first server to perform:

receiving identifying information revealing an identity of an individual, submitting a request corresponding to the received identifying information to an ID generation apparatus, receiving an anonymized user ID from the ID generation apparatus in return, and outputting the anonymized user ID to the individual; and a second non-transitory storage medium area storing a computer program which when executed by a second server, comprising a data storage unit that is inaccessible to the first server, causes the second server to perform:

receiving and storing personalized behavioral data, access to the stored personalized behavioral data being controlled by the second server, wherein the personalized behavioral data are from a behavioral data source device, the behavioral data source device being either one of a device configured to interact with the individual and to record information representing an interaction with the individual as behavioral data, and a sensor apparatus configured to record a series of measurements of a physical property of the individual as behavioral data, the second server receiving the behavioral data from the behavioral data source device as personalized behavioral data, personalized with the anonymized user ID of the individual, either from the behavioral data source device or from an intermediate device between the behavioral data source device and the second server; and controlling access to the stored personalized behavioral data by requiring that data access requests from service providers specify the anonymized user ID with which the personalized behavioral data are personalized to access the personalized behavioral data, including maintaining a list of service providers authorized to access the data store, determining whether a received data access request is from one of the service providers of the list, and when not, blocking the data access request;

the computer-readable non-transitory storage media further comprising:

a third non-transitory storage medium area storing a computer program which when executed by a third server, causes the third server to perform:

on behalf of the one of the service providers authorized to access the data store, receiving an anonymously personalized registration request from the individual, the anonymously personalized registration request being personalized only by the anonymized user ID, submitting a data access request to the data engine specifying the anonymized user ID and a range of the behavioral data personalized with the specified anonymized user ID, receiving behavioral data from within the range from the data engine, executing data processing on the received behavioral data, and outputting a data processing result on behalf of the individual.

10. The non-transitory storage media according to claim 9, further comprising:

a fourth non-transitory storage medium area storing a computer program which when executed by a fourth server causes the fourth server to perform:

receiving the request from the first server, creating the anonymized user ID by executing an irreversible process in response to receiving the request, and outputting the anonymized user ID to the individual via the first server.

\* \* \* \* \*